(12) United States Patent
McCauley et al.

(10) Patent No.: US 8,322,389 B2
(45) Date of Patent: Dec. 4, 2012

(54) SELF-TIGHTENING SNOW CHAIN AND METHODS OF USE

(75) Inventors: John J. McCauley, Winona, MN (US); Lester Stener, Blaine, MN (US)

(73) Assignee: Peerless Chain Company, Winona, MN (US)

( * ) Notice: Subject to any disclaimer, the term of this patent is extended or adjusted under 35 U.S.C. 154(b) by 0 days.

(21) Appl. No.: 13/096,396

(22) Filed: Apr. 28, 2011

(65) Prior Publication Data

US 2011/0198428 A1 Aug. 18, 2011

Related U.S. Application Data

(63) Continuation of application No. 11/670,844, filed on Feb. 2, 2007, now Pat. No. 7,963,306.

(60) Provisional application No. 60/765,346, filed on Feb. 2, 2006.

(51) Int. Cl.
*B60C 27/10* (2006.01)

(52) U.S. Cl. ........................ 152/219; 152/217; 242/384.7

(58) Field of Classification Search .................. 242/382, 242/384.7, 396.4, 378, 388, 385.4; 24/68 SK, 24/68 TT, 909; 152/185, 213 R, 213 A, 216, 152/217, 218, 219, 231
See application file for complete search history.

(56) References Cited

U.S. PATENT DOCUMENTS

| | | | |
|---|---|---|---|
| 1,618,941 A | 2/1927 | Meade | |
| 2,434,119 A | 1/1948 | Nordmark | |
| 2,480,335 A | 8/1949 | Nordmark | |
| 2,511,527 A | 6/1950 | Castongay | |
| 2,701,693 A | 2/1955 | Nordmark et al. | |
| 3,415,462 A | 12/1968 | Barecki et al. | |
| 3,478,981 A | 11/1969 | Barecki et al. | |
| 3,490,715 A | 1/1970 | Nicpon | |
| 3,693,596 A | 9/1972 | Croce et al. | |
| 3,853,283 A | 12/1974 | Croce et al. | |
| 4,188,061 A | 2/1980 | Shehi | |

(Continued)

FOREIGN PATENT DOCUMENTS

DE 33 36 056 A1 4/1985

(Continued)

OTHER PUBLICATIONS

USPTO—Complete Prosecution History of U.S. Appl. No. 11/670,844, "Self-Tightening Snow Chain and Methods of Use", Feb. 2, 2007-Jun. 1, 2011. (Excluding the Non-Patent Literature entry of the Prosecution History of U.S. Appl. No. 128/269,563 an Information Disclosure Statement).

(Continued)

*Primary Examiner* — Kip T Kotter
(74) *Attorney, Agent, or Firm* — Moore & Hansen, PLLC

(57) ABSTRACT

Self-tensioning snow chain for attachment to a vehicle wheel. The self-tensioning snow chain includes a chain and a tensioning device including a housing having a top including a set of housing teeth, a bottom and at least one aperture defined by the top and the bottom when joined together; a lever interconnected to the housing; a cord; a ratchet spool having a set of ratchet teeth on an upper surface, the ratchet teeth mate with the housing teeth, an under surface and a channel between the upper and under surfaces to receive the cord that is interconnected with the ratchet spool; a tension spring interconnected with the ratchet spool that places a bias on the ratchet spool toward a wind-up direction; and a wave spring positioned between a top surface of the bottom of the housing and the under surface to bias the ratchet spool towards the housing teeth.

24 Claims, 14 Drawing Sheets

U.S. PATENT DOCUMENTS

| | | | |
|---|---|---|---|
| 4,588,010 | A | 5/1986 | Melzi et al. |
| 4,648,434 | A | 3/1987 | Melzi et al. |
| 4,665,589 | A | 5/1987 | Gregorutti |
| 4,825,923 | A | 5/1989 | Blankenship et al. |
| 5,068,948 | A | 12/1991 | Blankenship et al. |
| 5,082,039 | A | 1/1992 | Franklin |
| 5,224,662 | A | 7/1993 | Kaussen |
| 5,361,612 | A | 11/1994 | Voiculescu et al. |
| 5,377,626 | A | 1/1995 | Kilsby et al. |
| 5,400,521 | A | 3/1995 | Waldherr |
| 5,920,962 | A | 7/1999 | Franklin |
| 6,009,922 | A | 1/2000 | Gogan |
| 6,092,577 | A | 7/2000 | Franklin |
| 6,213,421 | B1 | 4/2001 | Franklin |
| 6,530,406 | B1 | 3/2003 | Gentry |
| 6,915,825 | B1 | 7/2005 | Stevenson, Jr. |
| 2005/0008185 | A1 | 1/2005 | Jeong et al. |
| 2006/0015988 | A1 | 1/2006 | Philpott et al. |

FOREIGN PATENT DOCUMENTS

| | | |
|---|---|---|
| DE | 39 06 486 A1 | 9/1990 |
| DE | 40 39 665 A1 | 6/1992 |
| DE | 10 2004 037 332 B3 | 5/2005 |
| EP | 0 913 275 A2 | 5/1999 |
| EP | 1 839 914 A | 10/2007 |
| FR | 2 435 633 A1 | 4/1980 |
| JP | 09193631 A | 7/1997 |
| WO | WO 01/76895 A1 | 10/2001 |
| WO | WO 2005/095129 A1 | 10/2005 |

OTHER PUBLICATIONS

USPTO—Complete Prosecution History of U.S. Appl. No. 12/269,653, "Self-Tightening Traction Assembly Having Tensioning Device", Nov. 12, 2008-Feb. 16, 2011.

EPO—Prosecution History of EP Application 07717545.3, Apr. 24, 2008-Aug. 3, 2010.

PCT International Searching Authority—PCT/US07/61561—Written Opinion, Dec. 12, 2007.

Peerless Chain Company—PCT/US07/61561—Response to Written Opinion, Feb. 11, 2007.

PCT World Intellectual Property Organization—PCT/US07/61561—ISR, Dec. 12, 2007.

PCT The International Bureau of WIPO—PCT/US07/61561—International Preliminary Report on Patentability, Feb. 2, 2007.

Peerless Chain Company—PCT/US07/61561—Amended Claims, Nov. 2, 2008.

SELF-TIGHTENING SNOW CHAIN AND METHODS OF USE

RELATED APPLICATIONS

The present application is a continuation of U.S. patent application Ser. No. 11/670,844, filed on Feb. 2, 2007, now U.S. Pat. No. 7,963,306 which claims benefit of U.S. Provisional Application Ser. No. 60/765,346, filed Feb. 2, 2006, all of which are herein incorporated by reference.

FIELD OF THE INVENTION

The present invention relates generally to snow chains, particularly, snow chains that self-tighten to ensure proper fit. More particularly, the present invention relates to self-tightening snow chains having a tensioning device including a winding device and a tensioning cord, the snow chains having a tensioned mode when secured for use on a wheel of a land vehicle and a separate extended mode, wherein the tensioning cord, interconnected with the winding device is released to extend away from the winding device to permit the snow chain to be easily engaged with the wheel of the land vehicle prior to securing the snow chain to the wheel. In alternate embodiments, the present invention relates to self-tightening snow chains that self-tighten when a plurality of cords are tensioned by a single winding device. In further embodiments, the present invention relates to a tensioning device for a snow chain that places a spring bias upon a tensioning cord or a plurality of tensioning cords and/or is resistant to infiltration of dirt, debris and moisture. Methods of providing and using these inventions are also disclosed.

BACKGROUND OF THE DISCLOSURE

Self-tightening snow chains have been used to provide vehicles with improved traction when driving on irregular surfaces where poorer traction is anticipated (i.e., ice or snow covered surfaces, off-road or backcountry terrains). Numerous states require the use of snow chain under certain weather conditions to mitigate potential hazards. Some models of snow chains require retightening after initial chain installation, where all of the wheel chains need to be retightened after the vehicle has been slowly driven forward or backward. It is essential that snow chains fit properly to obtain proper performance and increase durability. Having to retighten the cables is burdensome for the user and has costly consequences if forgotten or neglected.

Because proper fit of the snow chains is so essential, self-tightening snow chains have been developed. One of these devices is disclosed in U.S. Pat. No. 6,213,421 to Franklin. The Franklin patent discloses a clamping lock for a traction device. The lock has a single clamping rope connected to a winding device within a housing. The winding device is pretensioned in the wind-up direction. Toothing is provided laterally around the winding device. There is an actuating lever attached to the housing that has three positions: a first catch position, which allows the clamping rope to move in or out of the housing; a second wind-up position, which unlocks the rope so it may move into the housing, thereby tightening the clamping rope; and a third locked position wherein the clamping rope is locked in its current position. The lever controls a pawl. Whether or not the clamping rope may be pulled in or out of the housing depends on whether the pawl is engaged with the teeth on the winding device.

Self-tightening snow chains having tensioning devices of this kind are difficult to secure to a wheel of a vehicle with two hands. A user may need to let go of the cord in order to better grip the tensioning device or grab the corresponding hook on the snow chain. In order to prevent the cord from being pulled back into the housing, the user must lock the cord in both directions to keep the cord in the extended position. Then, the cord would need to be unlocked to extend further, again requiring releasing either the cord or the corresponding hook. Additionally, self-tightening snow chain tensioning devices that can only tighten one cord are less cost effective because numerous self-tightening tensioning devices are required on each snow chain to tighten each cord.

Of further concern, self-tightening snow chain tensioning devices of this kind are made by simply screwing two flat-edged housing pieces together. Dirt, debris and moisture may easily penetrate this type of joint and cause damage to the mechanisms inside the housing. Additionally, the use of actuating levers creates an easy path for dirt, debris and moisture to enter and damage the device. It is also noted that the tensioning cord is generally equipped with crimped on or cast on ends and that one of these ends is then passed through a grommet and that the grommet and the cord are then incorporated into the tensioning device during assembly. In order to accept the crimped or cast on end, the opening in the grommet is required to be quite a bit larger than the diameter of the cord and the difference in size provides another area where an easy path is provided for dirt, debris and moisture to enter and damage the device.

SUMMARY OF THE INVENTION

The present invention provides a self-tensioning snow chain for attachment to a wheel of a vehicle, the self-tensioning snow chain includes a snow chain; and a tensioning device. The tensioning device includes (1) a housing having a top including a set of housing teeth, a bottom and at least one aperture defined by the top and the bottom when joined together; (2) a lever interconnected to the housing; (3) a cord; (4) a ratchet spool having a set of ratchet teeth on an upper surface, the ratchet teeth constructed and arranged to mate with the housing teeth, an under surface and a channel between the upper surface and the under surface in which sufficient space is provided to receive the cord, wherein the cord is interconnected with the ratchet spool; (5) a tension spring interconnected with the ratchet spool and constructed and arranged to place a bias on the ratchet spool toward a wind-up direction; and (6) a wave spring positioned between a top surface of the bottom of the housing and the under surface of the ratchet spool to bias the ratchet spool in the direction of the housing teeth; wherein the snow chain is interconnected with the tensioning device and the cord can be connected with the snow chain so that the tensioning device can secure the snow chain to the wheel. The snow chain can also be a traction cable or the like that is made out of rope, wire, wire rope, chains and the like.

It is an object of the present invention to provide a self-tightening snow chain that is easier to install. It is another object of the present invention to provide a self-tightening snow chain that may tighten a plurality of cords with one winding device, preferably a ratchet spool. It is yet another object of the present invention to provide a self-tightening snow chain having a tensioning device that is resistant to an infiltration of dirt, debris and moisture into the housing.

The present invention achieves these and other objectives by providing a self-tightening snow chain having two modes of operation. First, is an extended or extending mode that allows the user to extend the cord from the housing and release their grip on the cord without having the cord wind-up into the housing. The ability to only allow movement in a wind-out direction is created when the ratchet spool is in down position, where the spool, although biased in a wind-up direction, is blocked from turning in a wind-up direction. To get the ratchet spool in the down position, the user raises the actuating lever until it is perpendicular to the housing. This action forces a cam-lever to push the ratchet spool down. When the ratchet spool is in the down position, the ratchet teeth are disengaged with the housing teeth thereby allowing movement in any direction. Movement in the wind-up direction is prevented by catches on the under surface of a ratchet spool that are pushed into a zone of a stopper where they will be blocked by the stopper, thereby stopping the ratchet spool from turning in a wind-up direction more than a full turn, a half turn or preferably a quarter turn. When the user wants to continue extending the cord, the cord simply needs to be pulled further outward.

Second, is a self-tightening mode wherein the cord may only move in the wind-up direction. This mode is for when the cord is engaged and in use and the user wants to maintain constant tension on the snow chain without the possibility of the cord extending out. To operate in this mode, the user lowers the actuating lever until it snaps back into a position adjacent to the housing. When the actuating lever is down, the ratchet spool is up. Therefore, the housing teeth and the ratchet teeth are engaged to only allow movement in the wind-up direction. When the ratchet spool is in the up position, the catches cannot be blocked by the stopper, which would otherwise prevent more than a small movement of the ratchet spool in the wind-up direction.

In an alternate embodiments of the present invention, the ratchet and housing teeth may be overcut or undercut at an angle ranging from about 3 to about 30 degrees, preferably undercut about 20 degrees, so that when the device is in a wind-up mode and the cord is tugged outwardly, the harder the cord is tugged outwardly, the more the ratchet teeth will become engaged and resist the cord being moved in the wind-out direction.

In another embodiment of the tensioning device of the present invention, a plurality of cords, all interconnected with the same winding device or ratchet spool, may extend from different apertures or openings of the housing. Although it is possible to have more than three cords extend from a single tensioning device, such a device may be difficult to optimize because of the limited room on the ratchet spool, unequal forces that could be placed on each cord when in use and also the potential need for a tension spring that can generate greater winding force on the spool that may be needed to wind a greater number of cords.

Additionally, a lip and groove configuration may be utilized to aid in sealing the housing from dirt, debris and moisture. For example, a lip may trace along the opening of the housing top and a groove may trace along the opening of the housing bottom. When the two housing components are joined together, the lip and groove will mate to form a more secure seal than if two flat surfaces are pressed together. Alternatively, the lip may trace along the opening of the housing bottom and the groove may trace along the opening of the housing top.

To further protect the internal components, a grommet having an opening only slightly larger than the diameter of the cord may be utilized. If the grommet is secured around the cord prior to securing knobs at both ends of the cord, the grommet opening can be smaller than the diameter of the knobs, thereby reducing the size of the passageway in the grommet where dirt, debris and moisture can breach the housing.

BRIEF DESCRIPTION OF THE DRAWINGS

In the drawings, in which corresponding reference numerals and letters indicate corresponding parts of the various embodiments throughout the several views, and in which the various embodiments generally differ only in the manner described and/or shown, but otherwise include corresponding parts;

FIG. 12A is a perspective view of a ratchet spool 100', similar to that shown in FIG. 3, but for a dual cord tensioning device 11' of the present invention, wherein two tensioning cords 20a, 20b are wrapped around a single ratchet spool 100'; when the cords are fully wound in;

FIG. 12B is a perspective view of a ratchet spool 100" for a triple cord tensioning device 100" of the present invention wherein three tensioning cords 20a, 20b, 20c are wrapped around a single ratchet spool 100" when the cords are fully wound in;

DETAILED DESCRIPTION OF THE PREFERRED EMBODIMENTS

Figure 1:
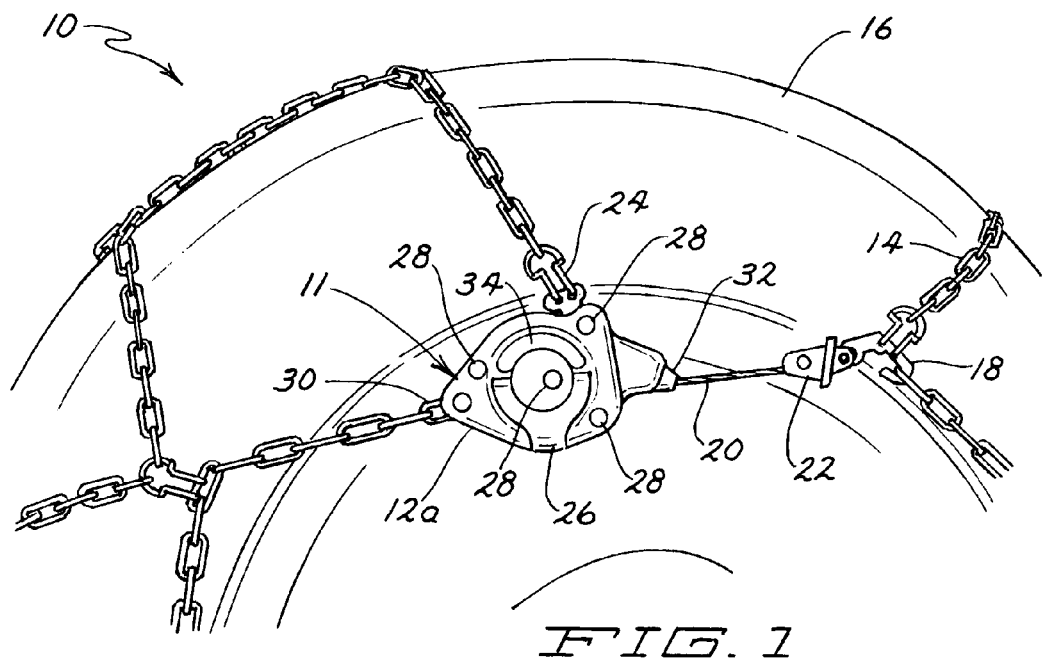
FIG. 1 is a perspective view of one embodiment of a self-tightening snow chain 10 of the present invention having a tensioning device 11, wherein the self-tightening snow chain is in use attached to a wheel 16 (partially shown)
Figure 2:
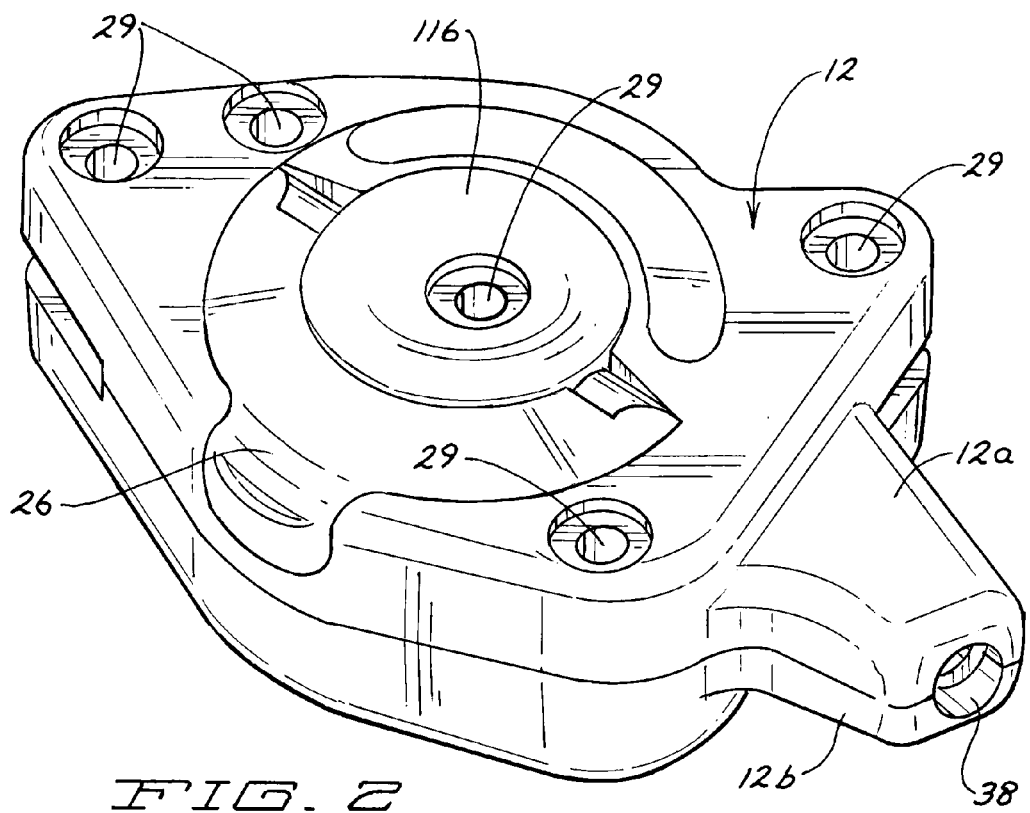
FIG. 2 is a perspective view of the tensioning device 11 of FIG. 1.
Figure 3:
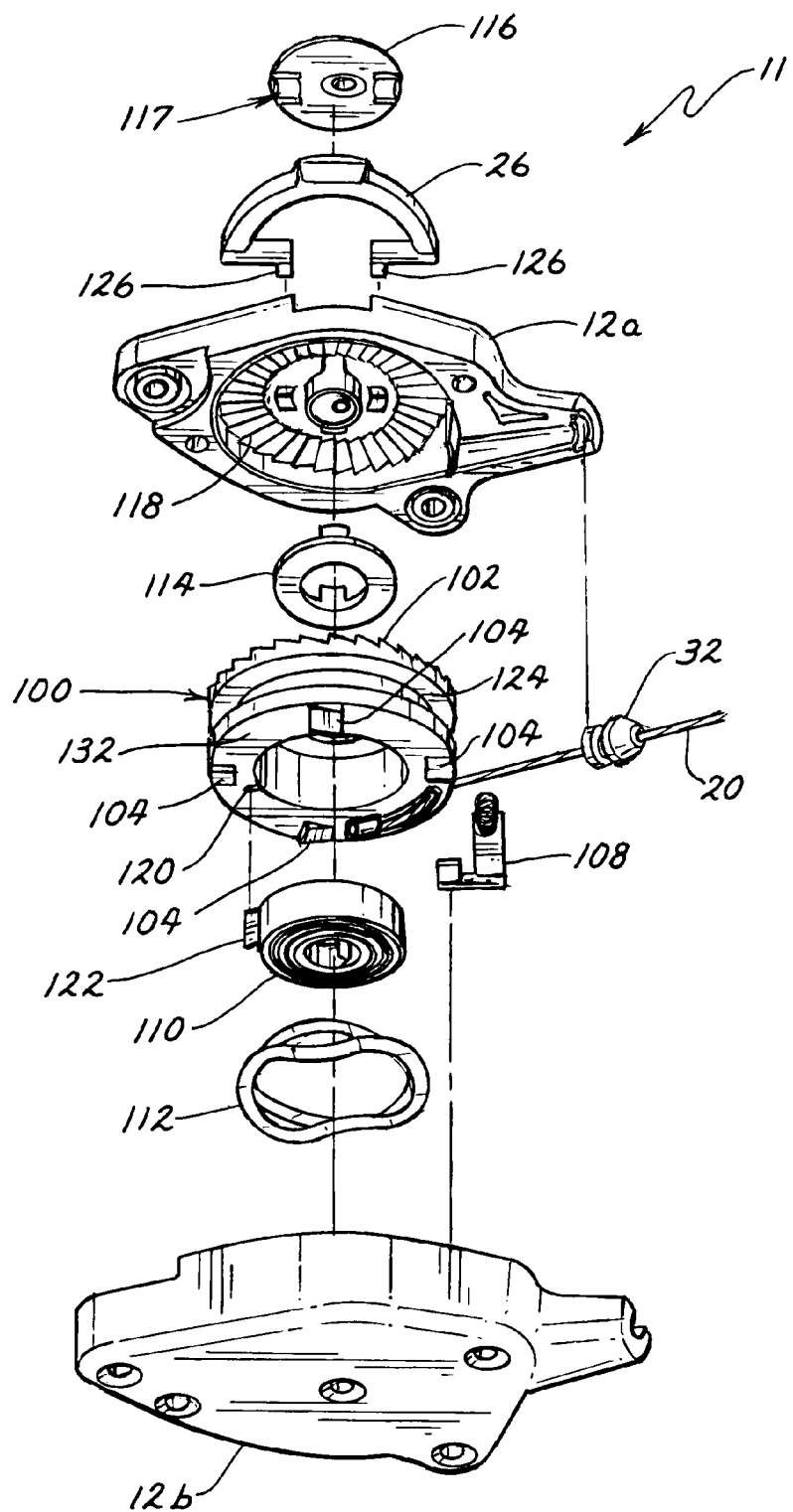
FIG. 3 is an exploded perspective view of the tensioning device 11 of FIGS. 1-2.

Preferred embodiments of the present invention are illustrated in FIGS. 1-16B. FIG. 1 is a perspective view of a self-tightening snow chain 10 of the present invention in use on a wheel 16 (partially shown). The self-tightening snow chain 10 comprises of a snow chain 14 and a tensioning device 11. Referring now also to FIGS. 2 and 3, the tensioning device 11 has a housing 12 including a first portion or housing top 12a, a second portion or housing bottom 12b, an actuating lever 26, a grommet 32, and a cord 20 extending through grommet 32 and connected to a hook 18 with a first connection member 22. The hook 18 connects to the chain 14 of the self-tightening snow chain 10, to supply tension to the chain 14. In this embodiment, there is a second connection point 24 and third connection point 30 where parts of the snow chain 14 are secured to the housing 12. Rivets 28 are placed through rivet receiving openings or recesses 29 to secure the housing top 12a to the housing bottom 12b, although any other fasteners such as threaded screws, bolts and nuts, adhesives, double backed tape and the like could be used. The housing top 12a has a recess 34 to prevent distortion during injection molding, which may additionally be used as a place for company identifiers and the like, if desired.

Figure 8A:
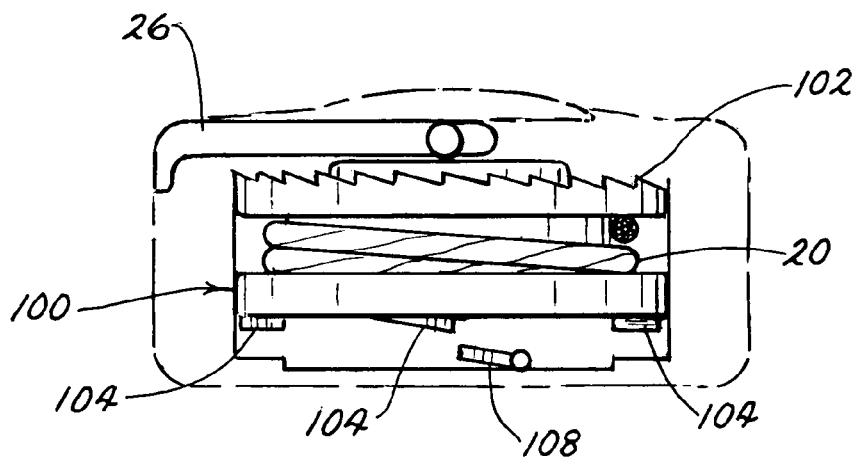
FIG. 8A is a partial, schematic view of the tensioning device 11 of FIG. 1 showing the internal components when the lever 26 is in a down or disengaged position and the ratchet spool 100 is in an up or engaged position within the housing, which is shown in phantom, but without showing the wave spring(s) to permit clarity.

FIG. 2 is a perspective view of the housing 12 of the tensioning device 11 shown in FIG. 1. The housing top 12a can be secured to the housing bottom 12b by rivets or threaded screws (not shown) that may inserted through the holes 29. The housing top 12a and the housing bottom 12b define an aperture 38 for receiving the grommet 32 that provides a passageway for the tensioning cord 20. Additionally, an actuating lever 26 including a cam 126 is pivotally connected to the housing top 12a. In preferred embodiments, the actuating lever can be positioned generally flush with the first portion 12a of the housing 12 as shown in FIGS. 2 and 8A.

Figure 8B:
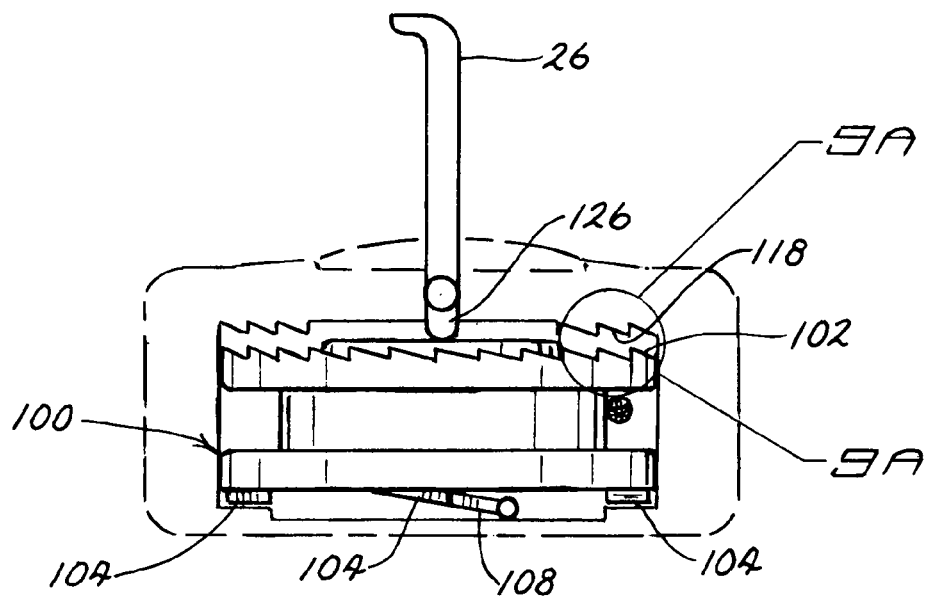
FIG. 8B is a partial, schematic view of the tensioning device 11 shown in FIG. 1, similar to that shown in FIG. 8A, but showing the tensioning device 11 when the lever 26 is in an up position and the ratchet spool 100 is in a down position.
Figure 9A:
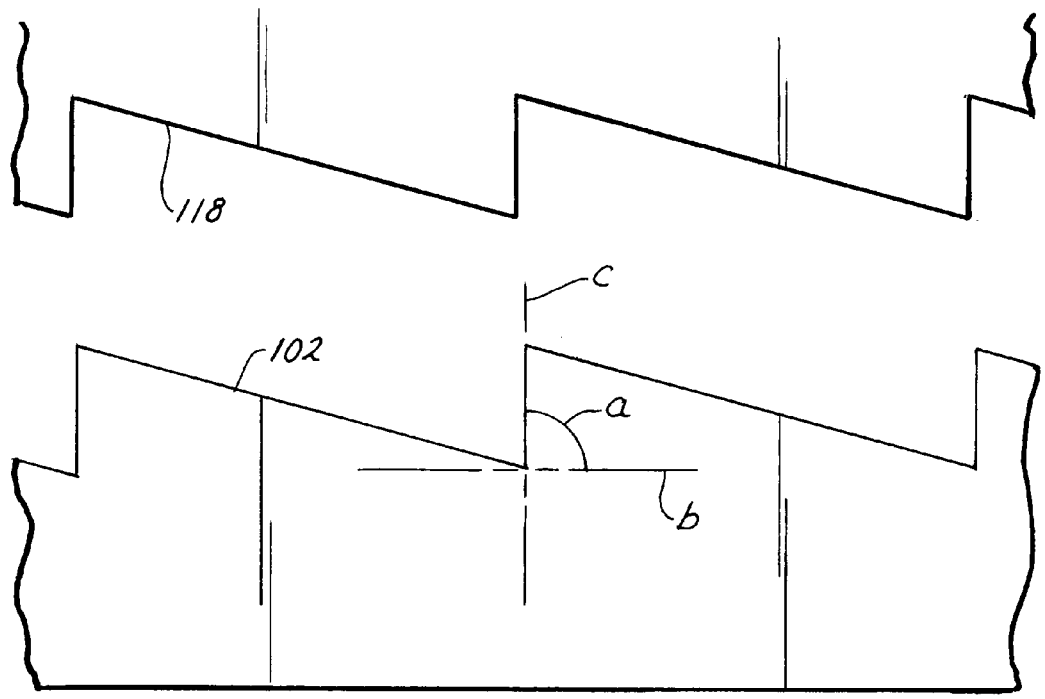
FIG. 9A is an enlarged, partial, schematic view of a portion of tensioning device 11 shown in area 9a-9a of FIG. 8B illustrating the ratchet teeth 102 and housing teeth 118 cut at an angle "a" of about 90 degrees to a horizontal plane "b" perpendicular to a vertical axis "c" of the ratchet spool and the housing.
Figure 9B:
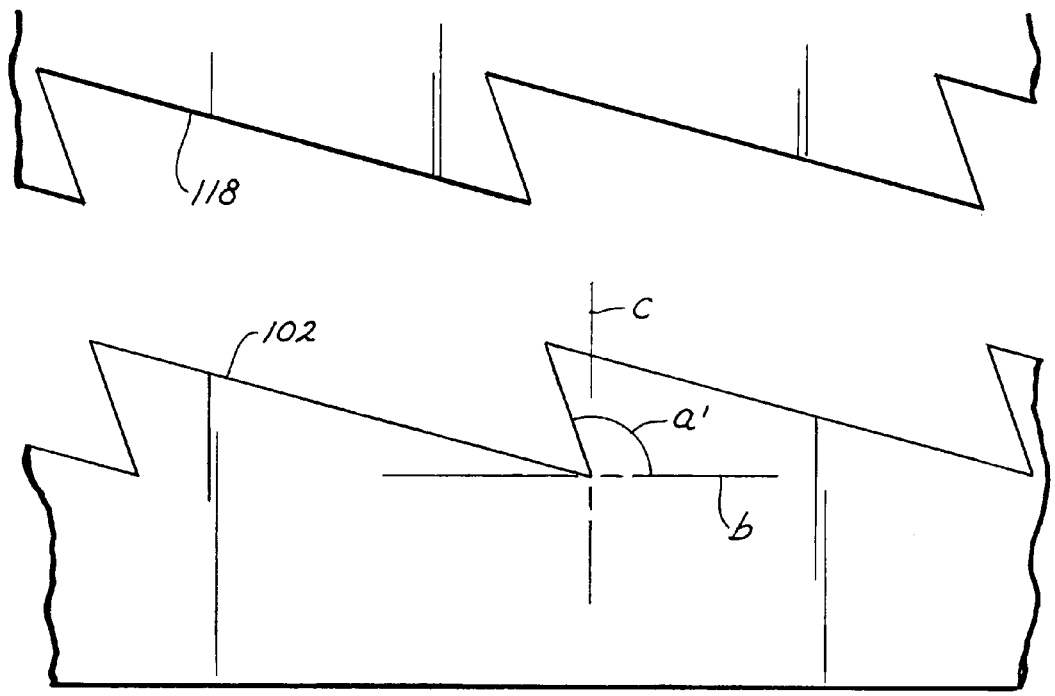
FIG. 9B is an enlarged, partial, schematic view similar to that shown in FIG. 9A, but illustrating a preferred embodiment, wherein the ratchet and housing teeth 102, 118 are undercut about 20 degrees more than a 90 degree angle to a horizontal plane "b" perpendicular to a vertical axis "c" of the ratchet spool and the housing.

In FIG. 3, there is illustrated an exploded view of one embodiment of the tensioning device 11 of the present invention. A wave spring 112 sits on the inside of the housing bottom 12b. The wave spring 112 is positioned in a way to apply pressure to the ratchet spool 100. The tension spring 110 also rests inside the ratchet spool 100 and has a crimp 122 that mates with a notch 120 in the ratchet spool 100 to secure the tension spring 110 to the ratchet spool 100. The ratchet spool 100 has a center channel 124 running circumferentially around its exterior and is sufficiently wide and deep enough for a cord 20 to be wound within the channel 124 around the ratchet spool 100. In this embodiment, the under surface 132 of the ratchet spool 100 has four catches 104. It is not essential that there be four catches 104 as two to six catches 104 will result in similar function. More than six catches 104 is possible but not recommended. As better shown in FIGS. 8A-8B, the catches 104 prevent the ratchet spool 100 from rotating in the wind-up direction when they are blocked by the stopper 108. The catches 104 can only be blocked by the stopper 108 when the ratchet spool 100 is in the down position (when the cam 126 is in the down position/the actuating lever 26 is in the up position). On the top of the ratchet spool 100 are ratchet teeth 102. As seen in FIGS. 8A and 8B, the ratchet teeth 102 can engage with the housing teeth 118 located in the housing top 12a when the actuating lever 26 is oriented in the down position. When the actuating lever 26 is in the down position, a cam 126, which extends from the actuating lever 26, is in an up position, where the cam is parallel to the plane of rotation of the ratchet spool 100. Therefore, there is no added pressure on the wave spring 112, which allows the wave spring 112 to push the ratchet spool 100 to its up position, engaging the ratchet spool 100 with the housing teeth 118. When the actuating lever 26 is in the up position shown in FIG. 8B, the cam 126 is in a down position, rotated approximately 90 degrees with respect to the up position, and the cam 126 pushes the top base 114 (see FIG. 3) down against the ratchet teeth 102, which are subsequently pushed down thereby disengaging the ratchet teeth 102 from the housing teeth 118. The top 116 has slots 117 for the cam levers 26 to rotate. The actuating lever 26, shown in FIGS. 2, 8A and 8B, is pivotally interconnected to the first portion 12a of the housing 12 such that when the actuating lever 26 pivots, the actuating lever 26 generally moves either closer to or away from the first portion 12a. The housing teeth 118 are molded into the housing top 12a.

Figure 4:
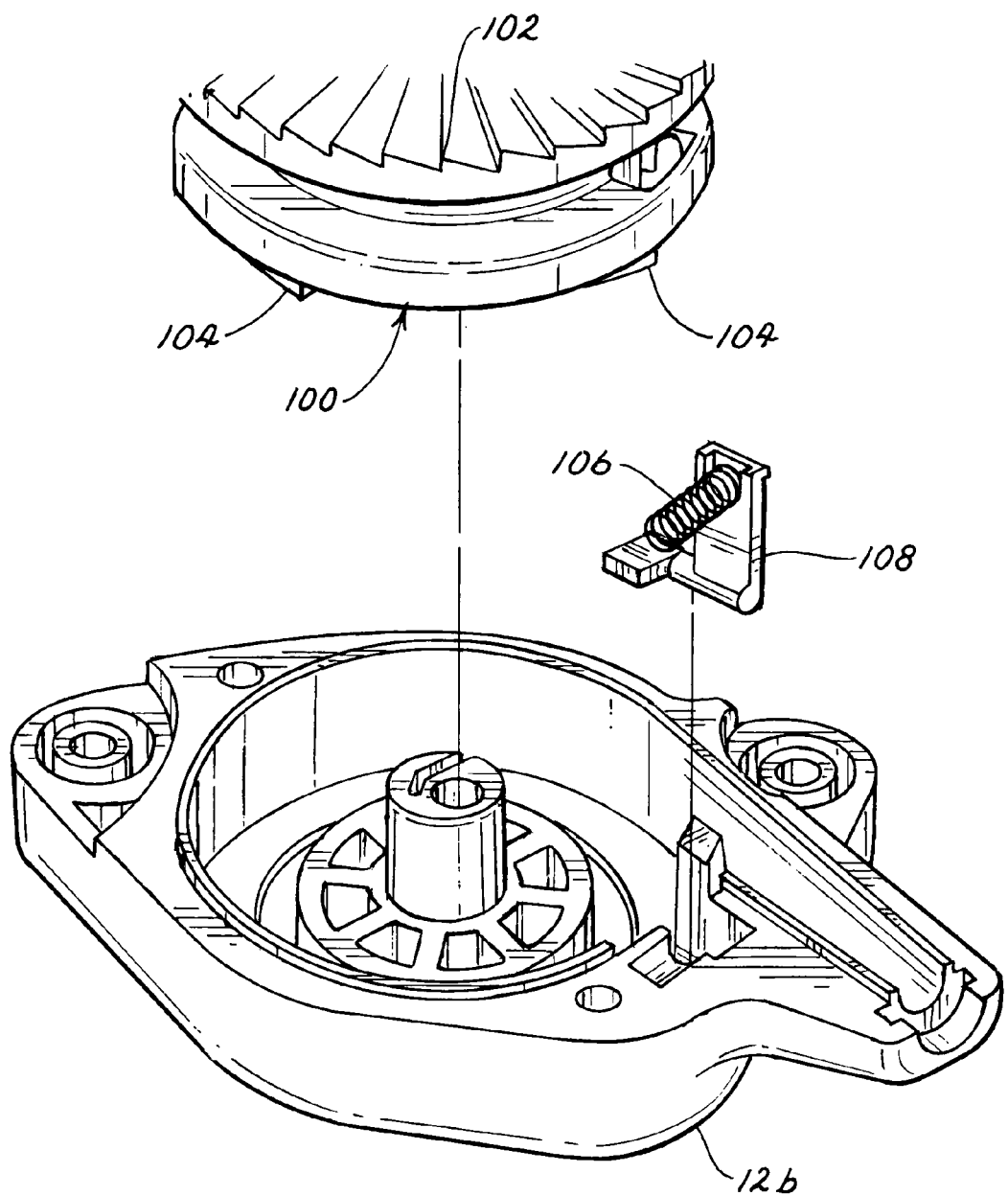
FIG. 4 is an exploded, partial, schematic view of certain components of the tensioning device 11 of FIGS. 1-3 illustrating the location of the ratchet spool 100, a compression spring 106 and a stopper 108 within a housing bottom 12b of the tensioning device.
Figure 5:
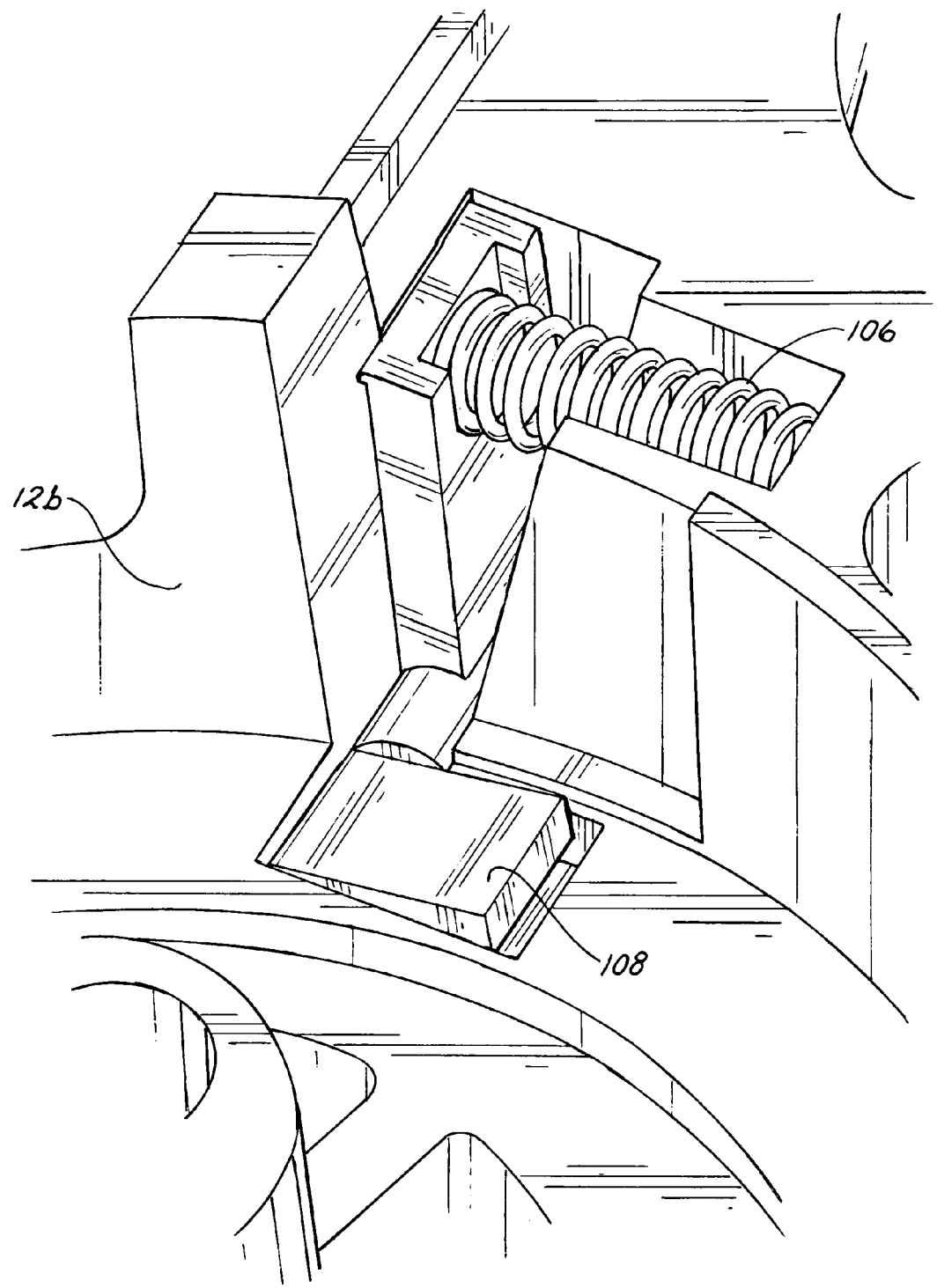
FIG. 5 is a partial perspective view of the stopper 108 and compression spring 106 of FIG. 4 fitted in the housing bottom 12b of the tensioning device 11 of FIG. 4.

The stopper 108 has an up position and a down position. Referring now also to FIGS. 4 and 5, showing the arrangement of the catches 104, the compression spring 106 and stopper 108 in the up position. The compression spring 106 is attached to the stopper 108 and they both are placed in the housing bottom 12b such that the compression spring 106 applies force to the housing bottom 12b. The compression spring 106 places a bias on the stopper 108 such that the stopper 108 will block a catch 104 should the ratchet spool 100 be in the down position and rotating in the wind-up direction so that the ratchet spool will not rotate more than 360 degrees in the wind-up direction when the ratchet spool 100 is in a down position. One preferred tensioning device 10 includes a housing 12 having a stop and a set of housing teeth; a winding mechanism including a spool 100 having set of ratchet teeth 102 and at least one catch 104, the winding mechanism located within the housing 12; and a cord 20 operatively connected to the spool 100; wherein the winding mechanism has two positions that control the movement of the cord 20, the first position being a wind-up position where the cord is pulled into the housing and cannot be pulled outwardly from the housing, the second position being a wind-out position wherein the cord may be pulled outwardly from the housing. In this preferred embodiment, if the cord 20 is pulled outwardly from the housing 12 and then released, while the winding mechanism is in the second position, the cord will retract into the housing until the catch 104 contacts the stop or stopper 108 such that the spool 100 will rotate less than 360 degrees before the catch contacts the stop and the stop is spring biased such that the stop will block one of the at least one catches when the ratchet teeth are disengaged with the housing teeth and the spool is rotating in a wind-up direction.

Figure 6:
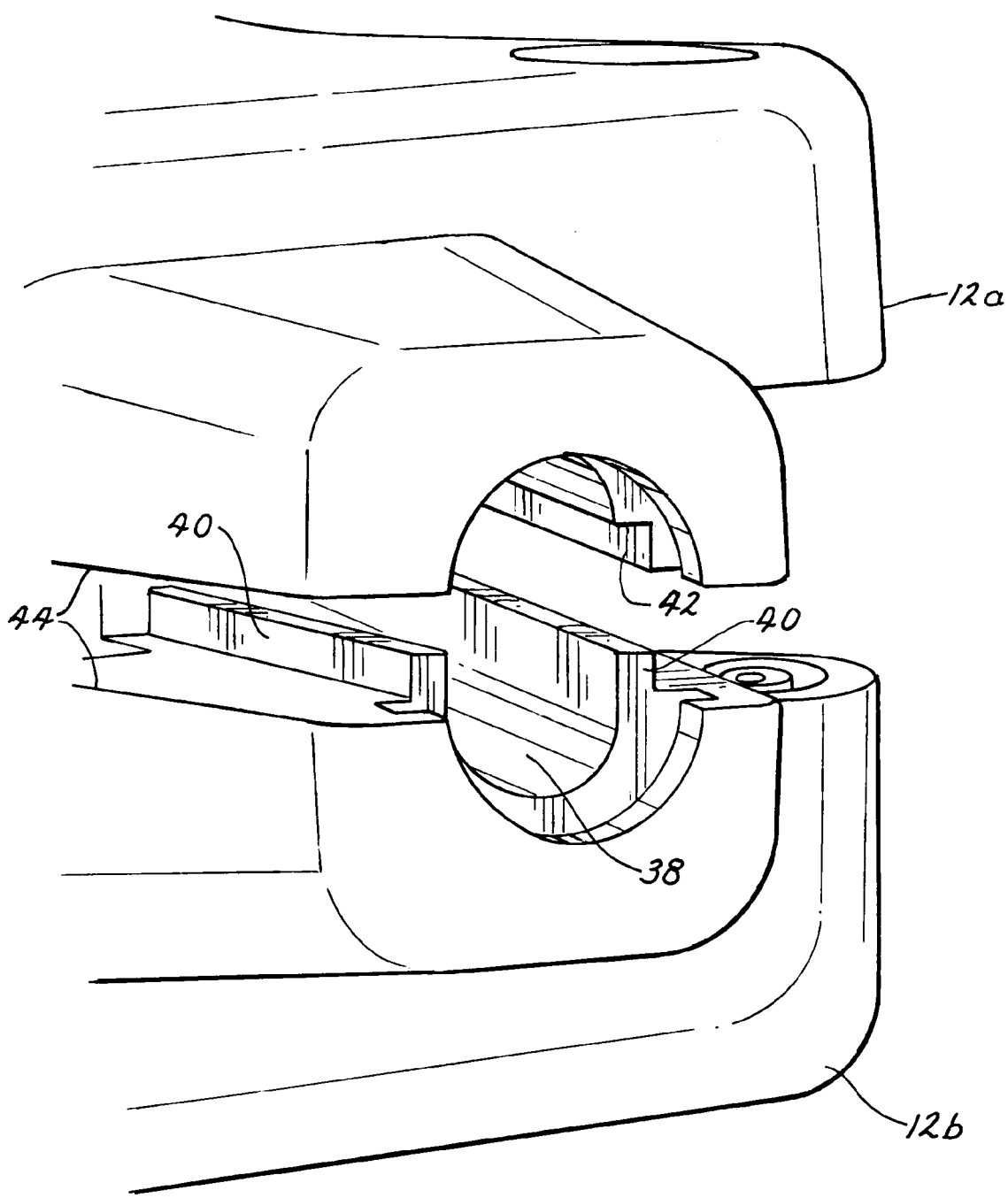
FIG. 6 is a partial perspective view of a portion of the housing of the tensioning device of FIGS. 1-5 illustrating elements 40, 42 of a housing lip and groove joint.

Now also referring to FIG. 6 showing the lip 40 and groove 42 configuration near the aperture 38 defined by the housing 12. The lip 40 and groove 42 mate to form a housing joint 44 resistant to dirt, debris and moisture. The present invention further includes a method of attaching two housing pieces of a tensioning device for use with a self-tensioning snow chain, wherein the method comprises the steps of providing a first and second housing piece 12a, 12b. One respective housing piece 12b has a lip 40 and the other respective housing piece 12a has a groove 42 such that the lip can be mated with the groove within a joint between the top and the bottom 12a, 12b of the housing 12.

Figure 7A:
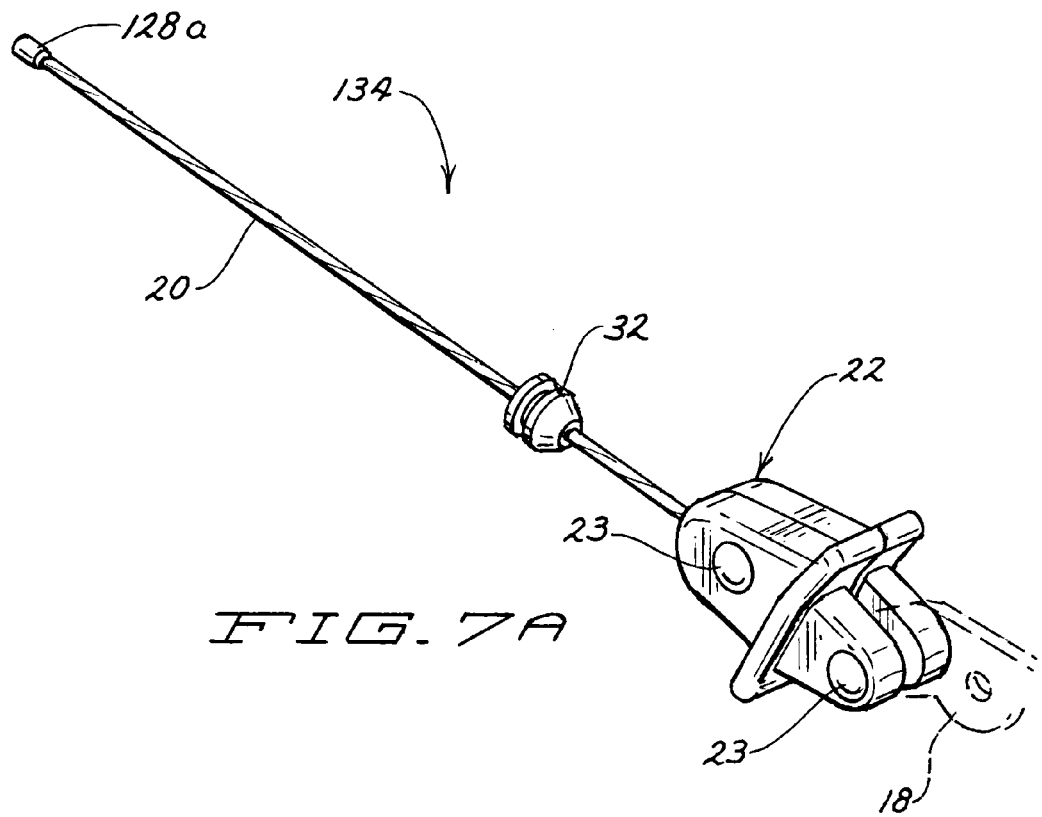
FIG. 7A is a perspective view of a tensioning cord sub-unit 134 of the tensioning device 11 of FIGS. 1-6 and showing the hook 18, to which the connector 22 is secured, in phantom.
Figure 7B:
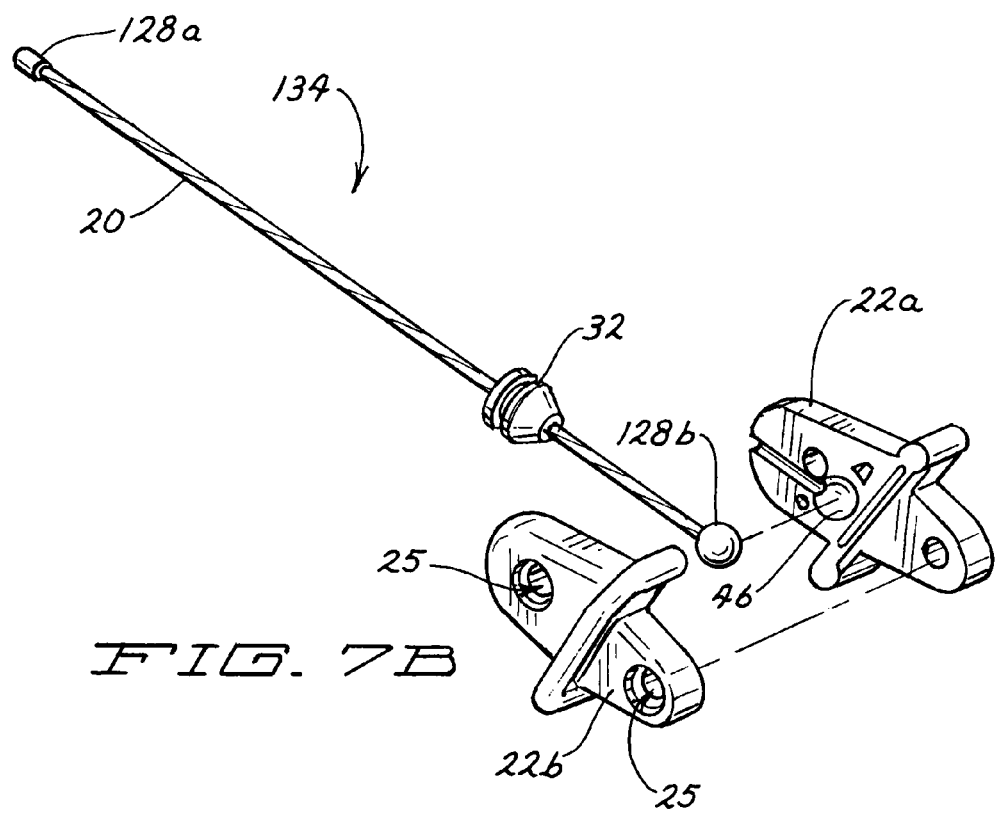
FIG. 7B is a perspective view of components of the tensioning cord sub-unit 134 shown in FIG. 7A, before it is completely assembled.

Now also referring to FIGS. 7A and 7B showing an assembled tensioning cord sub-unit 134. A cord 20 is threaded through a grommet 32 and has a first knob 128a and a second knob 128b. The knobs 128 may be fitted to the cord 20 by crimping, melting, casting and the like. The cord 20 is threaded through the grommet 32 before both of the knobs 128 are fitted to the cord 20, which permits the diameter of the grommet 32 to be smaller than the diameter of the knobs 128, so that the grommet 32 may more closely fit the cord 20, allowing the grommet to be more appropriately sized to limit the infiltration of dirt, debris and moisture into the housing 12. The cord 20 is attached to the first connection member 22 that is connected to a hook 18 (shown in phantom) used for securing the tensioning device 11 to parts of the snow chain 14. FIG. 7B shows how the second knob 128b fits into a recess 46 (partially shown) formed by a first piece 22a and second piece 22b of the first connection member 22. The first and second pieces 22a and 22b are secured together around the second knob 128b that is tightly secured to the cord 20. Rivets 23 are placed through rivet receiving openings 25 to secure first and second pieces 22a and 22b together, although any other fasteners such as threaded screws, bolts and nuts, adhesives, double backed tape and the like could be used.

Referring now also to FIGS. 8A and 8B, FIG. 8A is a sectional view showing the internal components when the actuating lever 26 is in the down position thereby allowing the ratchet spool 100 to be in the up position. When the ratchet spool 100 is in the up position, the catches 104 are clear of the stopper 108 thereby allowing the ratchet spool 100 to freely wind-up and tighten the cord 20. In this mode, the ratchet spool 100 may only rotate in the wind-up direction, because the ratchet teeth 102 can fully engaged with the housing teeth 118 to limit rotation if an extending or wind-out force was applied to the cord 20.

FIG. 8B is a sectional view showing the internal components when the actuating lever 26 is in the up position thereby forcing the ratchet spool 100 to be in the down position with the cam 126. While the ratchet spool 100 is in the down position, the ratchet teeth 102 are disengaged from the housing teeth 118. This would allow the ratchet spool 100 to rotate freely in either direction. The catches 104 are what stop the ratchet spool 100 from fully rotating in the wind-up direction. As the ratchet spool 100 begins to rotate in the wind-up direction, the stopper 108 will block the next catch 104 it encounters, thereby preventing the ratchet spool 100 from further winding-up.

In the embodiment shown in FIGS. 8A through 9A, the ratchet teeth 102 and the housing teeth 118 are cut at an angle "a1" of about 90 degrees. In alternate embodiments of the present invention, the ratchet teeth 102 and housing teeth 118 may be overcut or undercut. The teeth 102, 118 may be cut at an angle ranging from about 3 to about 30 degrees, preferably from about 10 to about 25 degrees so that when the tensioning device 11 is in a wind-up mode and the cord is tugged outwardly, the harder the cord 20 gets tugged outwardly, the more the ratchet teeth 118 will become engaged and resist the cord 20 being moved in the wind-out direction. In the most preferred embodiments, the angle "a2" is an undercut of about 20 degrees as illustrated in FIG. 9B.

Figure 10A:
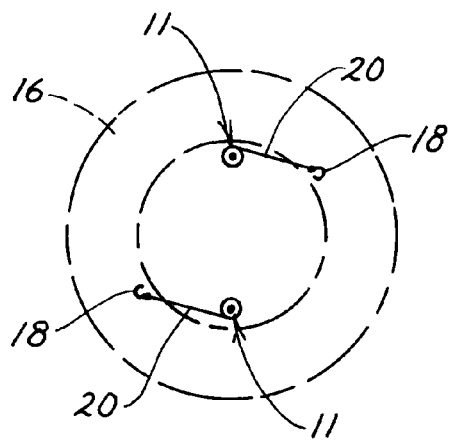
FIG. 10A is a diagrammatic view of the positioning of the tensioning devices 11 of the present invention showing a preferred positioning on a wheel 16 (shown in phantom) of two, single-cord tensioning devices 11 similar to the one shown in FIG. 1.

Now referring also to FIG. 10A, FIG. 10A is a diagrammatic view of one embodiment of the present invention showing the preferred positioning of two, single tensioning devices 11 attached to a wheel 16. In this embodiment, the tensioning devices 11 are approximately 180 degrees from each other and their respective cords 20 and hooks 18 extend in opposite directions.

Figure 10B:
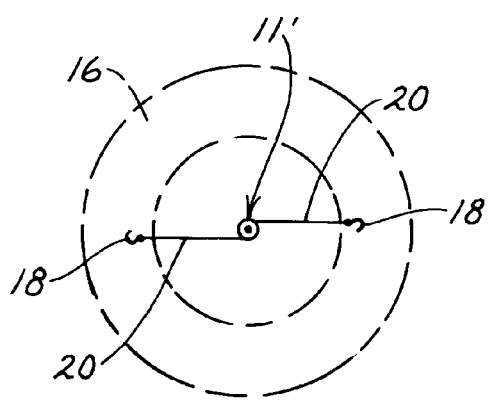
FIG. 10B is a diagrammatic view of the positioning of an alternate tensioning device 11' of the present invention showing a preferred positioning of a single, dual cord tensioning device 11' that tightens two tensioning cords 20 with respect to a snow cable (not shown) on a wheel 16 (shown in phantom)
Figure 10C:
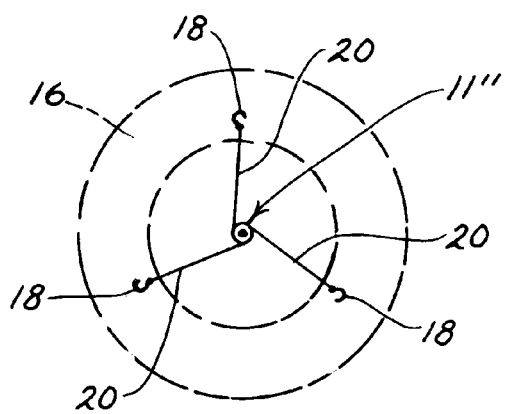
FIG. 10C is a diagrammatic view of the positioning of an alternate tensioning device 11" of the present invention showing a preferred positioning of a single, multiple cord tensioning device 11" that tightens three tensioning cords 20 with respect to a snow cable (not shown) on a wheel 16 (shown in phantom)

Referring now also to FIGS. 10B and 10C, FIG. 10B is a diagrammatic view of one embodiment of the present invention showing the preferred positioning of a single, tensioning device 11' attached to a first cord 20 and a second cord 20a that each have their respective hooks 18. In this embodiment, the tensioning device 11' is centered with the exterior of the wheel 16 to provide equal tension on the first cord 20a and the second cord 20b which extend parallel to each other.

FIG. 10C is a diagrammatic view of one embodiment of the present invention showing the preferred positioning of a single, tensioning device 11" attached to a first cord 20, a second cord 20b, and a third cord 20c that each have their respective hooks 18. The tensioning device 11" is centered with the exterior of the wheel 16 to provide equal tension on the first cord 20a, the second cord 20b, and the third cord 20c, which extend approximately 120 degrees from each other.

Figure 11A:
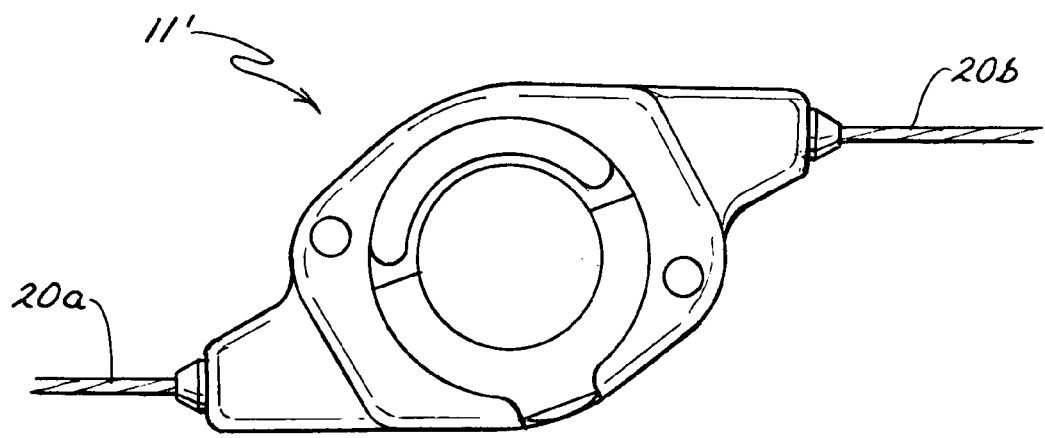
FIG. 11A is a plan view of a dual cord tensioning device 11', similar to the tensioning device 11 shown in FIG. 1, but where the tensioning device 11' includes two cords 20a, 20b.
Figure 11B:
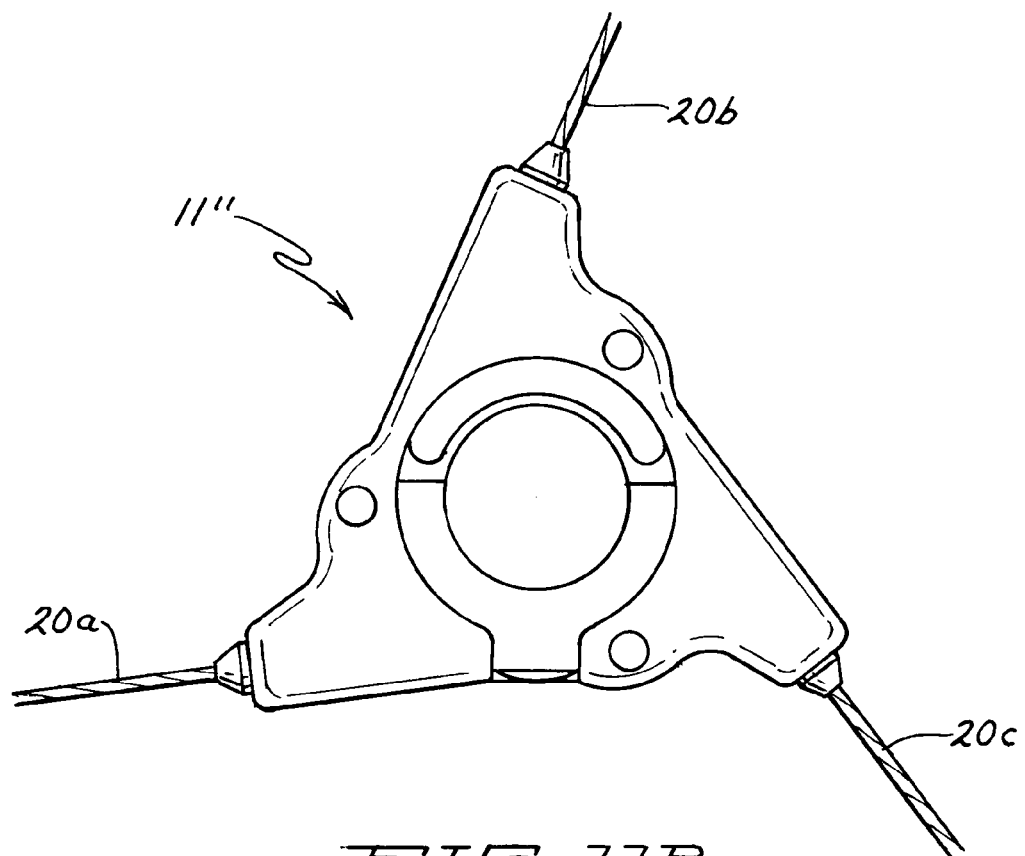
FIG. 11B is a plan view of a triple cord tensioning device 11", similar to the tensioning device 11 shown in FIG. 1, but where the tensioning device 11" includes three cords 20a, 20b, 20c.

Now referring also to FIG. 11A that shows another embodiment of the tensioning device of the present invention wherein the tensioning device 11' tensions a first cord 20a and a second cord 20b. Referring now also to FIG. 11B, which shows another embodiment of the tensioning device 11' of the present invention, wherein the tensioning device 11" applies tension to a first cord 20a, a second cord 20b and a third cord 20c.

Figure 12A:
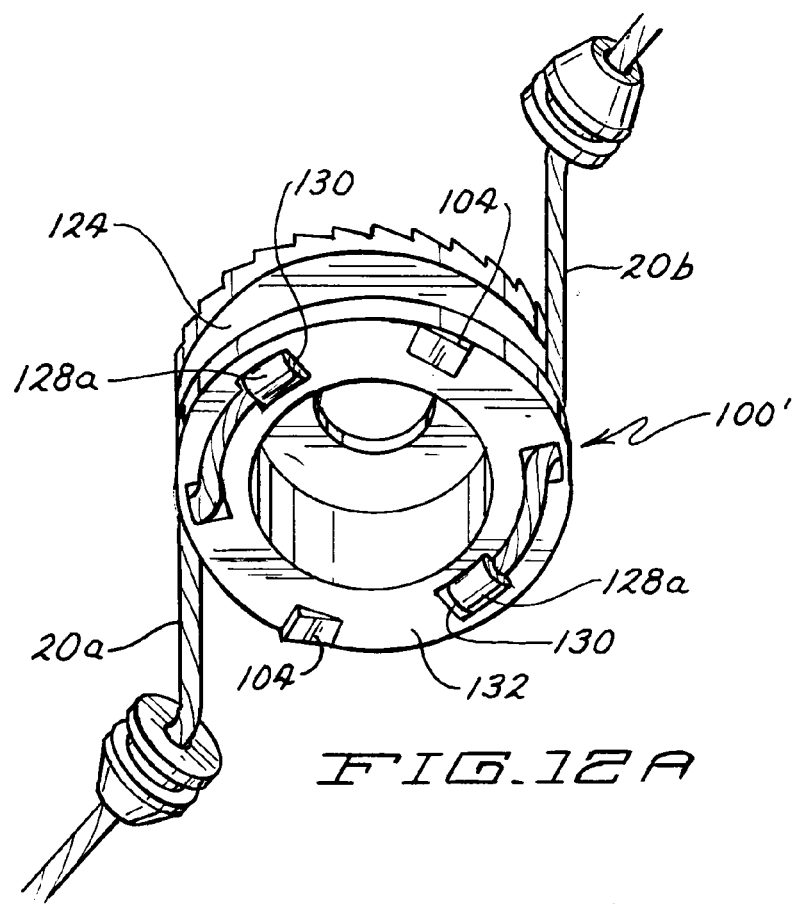

Now referring also to FIG. 12A, FIG. 12A is a perspective view of one embodiment an alternate ratchet spool 100' of the present invention showing the ratchet spool 100' configuration of having a first cord 20a and a second cord 20b that are attached to the ratchet spool 100' and wound in the channel 124. In this embodiment, only two catches 104 are on the under surface 132 of the ratchet spool 100', because less space is available. The first cord 20a and second cord 20b have a first knob 128*a* fitted to their respective ends sized to fit snuggly into the ratchet spool recess 130 to prevent the first cord 20*a* and the second cord 20*b* from being pulled off of the ratchet spool 100'.

Figure 12B:
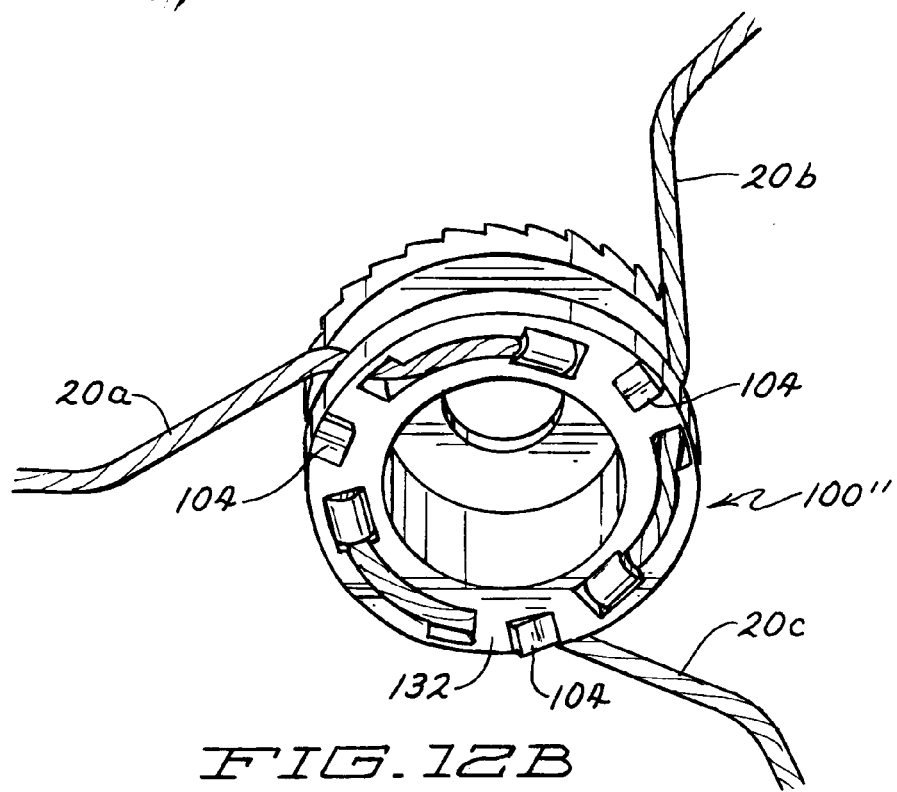

Referring now also to FIG. 12B, FIG. 12B shows a perspective view of an embodiment of the present invention showing a further alternate ratchet spool 100" configuration having a first cord 20*a*, a second cord 20*b*, and a third cord 20*c*.

Referring now to FIGS. 13-16B, there is illustrated an alternate tensioning device 11''' having a housing 12''' having a housing top 12*a'''* and a housing bottom 12*b'''*. There are holes 29 where rivets (not shown) will be inserted to attach the housing top 12*a'''* and the housing bottom 12*b'''* as in the other embodiments of the tensioning device. Located on the housing top 12*a'''* is a top button 138. Additionally, on the side of the housing 12''' are a first side button 136*a* and a second mirroring side button 136*b* (not shown). Protruding from the housing 12''' is a grommet 32 from which a cord 20 (not shown) may pass.

Figure 13:
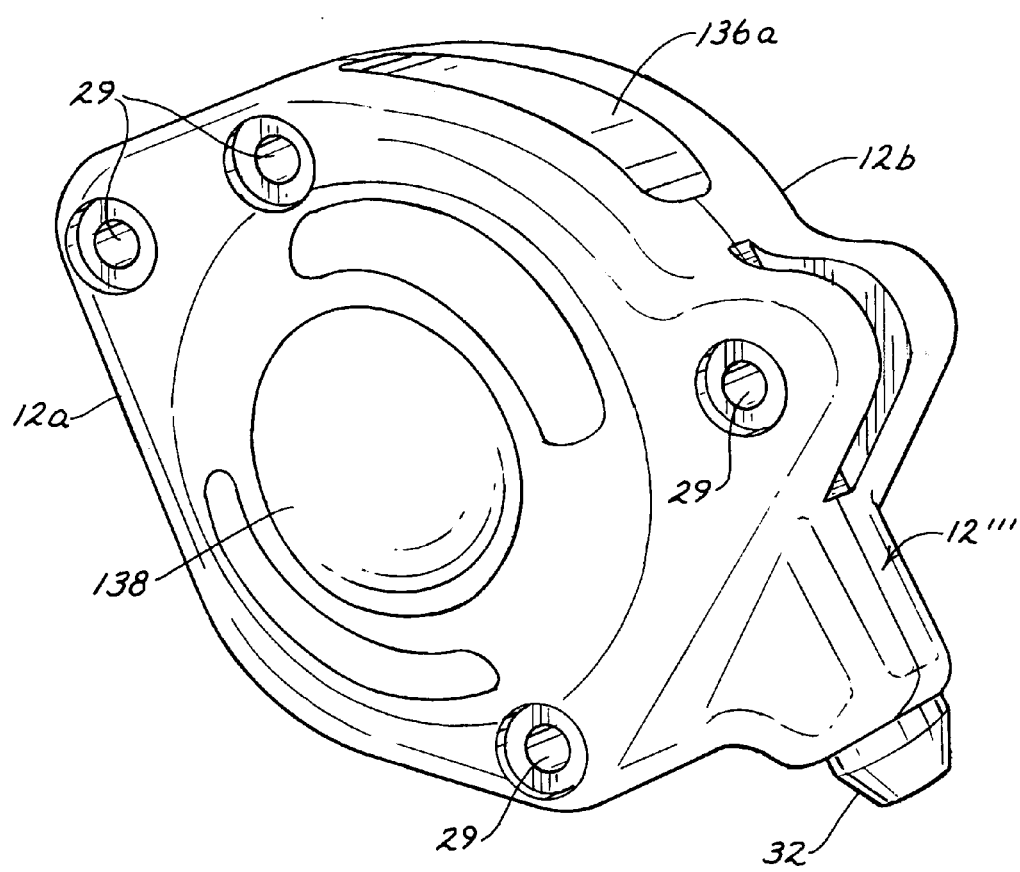
FIG. 13 is a perspective view of the housing 12''' of an alternate embodiment of a single cord tensioning device; wherein buttons 136b are used to actuate or change tensioning device modes.
Figure 14:
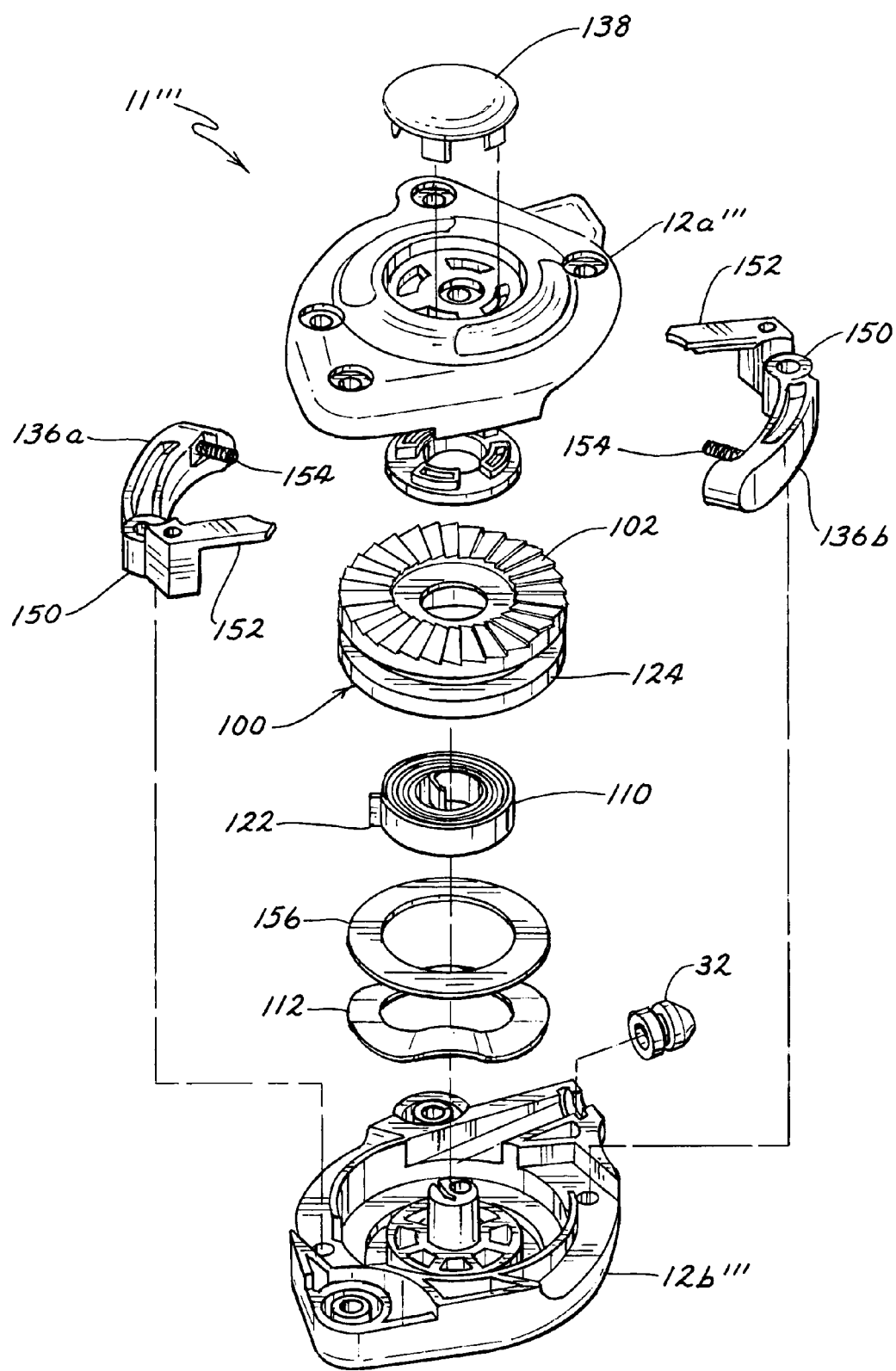
FIG. 14 is an exploded view of an alternate single cord tensioning device 11''' having a housing 12''' like that shown in FIG. 13, but not including a tensioning cord sub-unit.
Figure 16A:
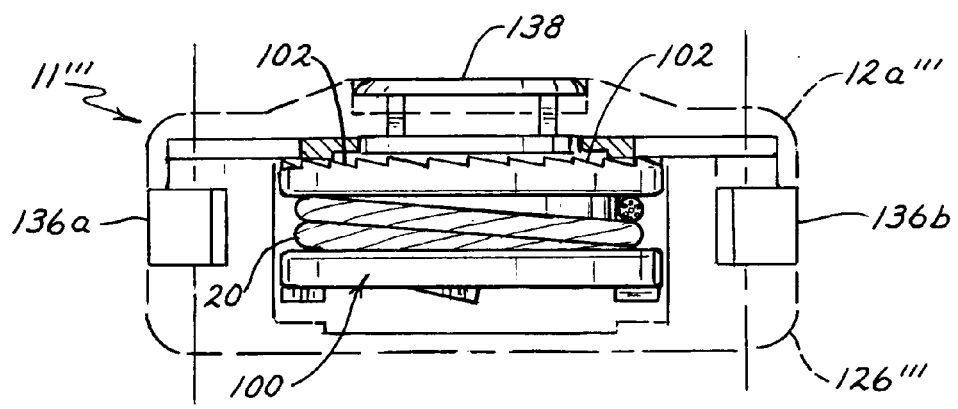
FIG. 16A is a sectional view, similar to that shown in FIG. 8A, but showing the alternate tensioning device 11''' of FIG. 13, showing the internal components when the top button 138 is in the up position and the ratchet spool 100 is in the up position (wave spring(s) not shown for clarity)
Figure 16B:
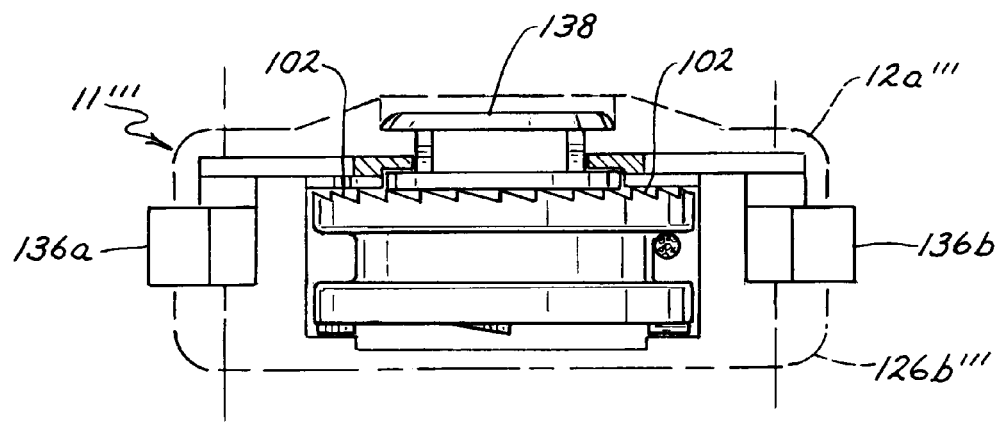
FIG. 16B is a sectional view, similar to that shown in FIG. 8B, but showing the alternate tensioning device 11''' of FIG. 13, showing the internal components when the top button 138 is in the down position and the ratchet spool 100 is in the down position (wave spring(s) not shown for clarity).

FIG. 14 shows an exploded view of the tensioning device 11''' shown in FIG. 13, but without the tensioning cord subunit 134. A wave spring 112 sits on the inside of the housing bottom 12*b'''* and is positioned in a way to apply pressure to the ratchet spool 100. A washer 156 is placed in between the wave spring 112 and the ratchet spool 100. The tension spring 110 also rests inside the ratchet spool 100 and has a crimp 122 that can be inserted into a notch 120 (not shown) in the ratchet spool 100, similar to that shown in FIG. 3, to secure the tension spring 110 to the ratchet spool 100. The ratchet spool 100 has a channel 124 running around the outside of the ratchet spool 100 in the center and is sufficiently wide and deep enough for a cord 20 (not shown) to be wound around the ratchet spool 100 within the channel 124. On the top of the ratchet spool 100 are ratchet teeth 102. The ratchet teeth 102 engage with the housing teeth 118 (not shown). In addition, there is a pawl 152, connected to each of the side buttons 136, having a pivot point 150. The side buttons 136 are spring loaded with a pawl spring 154. As seen in FIGS. 16A and 16B, the ratchet teeth 102 engage with the housing teeth 118 (not shown) located in the housing top 12*a'''* when the top button 138 is in the up position. When the top button 138 is in the up position, the ratchet spool 100 can only move in the wind-in direction to tighten the cord 20 (not shown). In this mode, the side buttons 136 are pushed into the housing 12'''. When the top button 138 is in the down position, the ratchet spool 100 may move in either the wind-in or wind-out direction. In this mode, the side buttons 136 are pushed out of the housing 12''' by the force of the spring 154.

Figure 15:
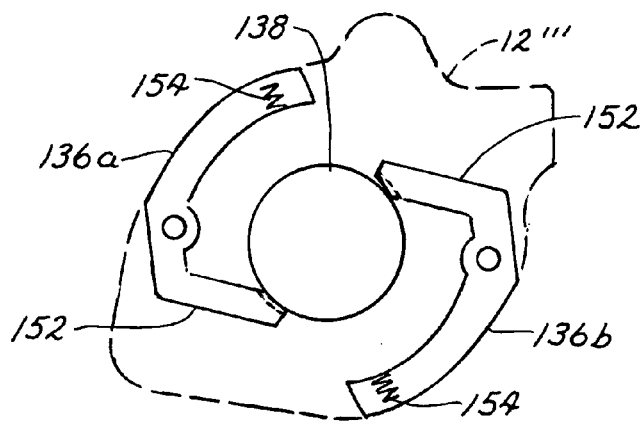
FIG. 15 is a diagrammatic view of the tensioning device 11''' of FIGS. 13 and 14, showing the pivot and contact points of the pawls 152 and top button 138.

Referring now also to FIG. 15, showing the positioning of the top button 138 and the side buttons 136 when the top button 138 is in the up position. Here, the side buttons 136 are pushed into the housing 12'''. Two button springs 154 rest against the interior of the housing top 12*a'''* and apply pressure to move the side buttons 136 out of the housing 12'''. However, the side buttons 136 do not move out of the housing because the pawls 152 are stopped by the top button 138. When the top button 138 is pushed down, the pawls 152 are no longer blocked and the side buttons 136 will pop out of the housing 12'''. When housing teeth 118 are not in contact with the ratchet teeth 102 (not shown), the ratchet spool 100 (not shown) can rotate freely.

Referring now also to FIGS. 16A and 16B, FIG. 16A, shows the arrangement of the side buttons 136, the top button 138, the ratchet teeth 102, and the housing teeth 118 when the top button 138 is in the up position. When the top button 152 is in the up position, the pawls 152 engage with the ratchet teeth 102 and the ratchet spool 100 can only move in the wind-up direction. In this view, for clarity, the wave spring 112 is not shown.

Referring now also to FIG. 16B, illustrating the arrangement of the top button 152, the ratchet teeth 102, and the housing teeth 118 when the top button 138 is in the down position. As the top button 138 gets pushed into to the down position, the force created by the button springs 154 (see FIGS. 14 and 15) snaps the pawls 152 away from the ratchet teeth 118 so that the ratchet spool 100 can move in the wind-in or wind-out direction. To switch modes and prevent the ratchet spool 100 from rotating in the wind-out direction, the user presses the side buttons 136 back into the housing 12''' to force the top button 138 back up and allow the pawls 152 to again come into contact with the ratchet teeth 118. In this view, for clarity, the wave spring 112 is not shown.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A tensioning device comprising:
 a housing having a first portion and a second portion; the first portion having a set of housing teeth;
 an actuating lever having a cam, wherein the actuating lever is pivotally interconnected to the first portion of the housing; wherein the housing and the actuating lever are arranged and configured such that the actuating lever can snap into and be generally flush with the first portion;
 a ratchet spool positioned within the housing, the ratchet spool having two opposing surfaces and a set of teeth located on one of the surfaces; and
 a cord wrapped at least partially around the ratchet spool; wherein the ratchet spool is tensioned in a direction to wind up the cord;
 wherein the ratchet spool is biased in the direction of the housing teeth so that the ratchet teeth will be engaged with the housing teeth when the ratchet spool is in an up position; wherein when the actuating lever is in an up position, the cam pushes the ratchet spool against the bias such that the ratchet teeth and the housing teeth disengage.

2. The tensioning device of claim 1, wherein the ratchet teeth and the housing teeth are undercut at an angle of more than 90 degrees to a horizontal plane perpendicular to a vertical axis of the ratchet spool and the housing.

3. The tensioning device of claim 1, wherein the ratchet spool is biased with a wave spring.

4. The tensioning device of claim 1, wherein the ratchet spool further includes a catch on a bottom surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

5. The tensioning device of claim 1, wherein a joint between the first portion and the second portion is constructed and arranged to include a lip and groove that mate with one another.

6. The tensioning device of claim 1, wherein a plurality of cords are interconnected to the ratchet spool.

7. A tensioning device comprising:
a housing having a first portion and a second portion, the first portion having a set of housing teeth;
an actuating lever having a cam, wherein the actuating lever is pivotally interconnected to the first portion of the housing; wherein, when the cam is moved from a down position to an up position, the cam rotates approximately 90 degrees;
a ratchet spool positioned within the housing, the ratchet spool having two opposing surfaces and a set of teeth located on one of the surfaces; and
a cord wrapped at least partially around the ratchet spool; wherein the ratchet spool is tensioned in a direction to wind up the cord;
wherein the ratchet spool is biased in the direction of the housing teeth so that the ratchet teeth will be engaged with the housing teeth when the ratchet spool is in an up position; wherein when the actuating lever is in the up position, the cam pushes the ratchet spool against the bias such that the ratchet teeth and the housing teeth disengage.

8. The tensioning device of claim 7, wherein the ratchet teeth and the housing teeth are undercut at an angle of more than 90 degrees to a horizontal plane perpendicular to a vertical axis of the ratchet spool and the housing.

9. The tensioning device of claim 7, wherein the ratchet spool is biased with a wave spring.

10. The tensioning device of claim 7, wherein the ratchet spool further includes a catch on a bottom surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

11. The tensioning device of claim 7, wherein a joint between the first portion and the second portion is constructed and arranged to include a lip and groove that mate with one another.

12. The tensioning device of claim 7, wherein a plurality of cords are interconnected to the ratchet spool.

13. A tensioning device comprising:
a housing having a first portion and a second portion; the first portion having a set of housing teeth;
an actuating lever having a cam, wherein the actuating lever is pivotally interconnected to the first portion of the housing such that when the actuating lever pivots, the actuating lever generally moves either closer to or away from the first portion;
a ratchet spool positioned within the housing, the ratchet spool having two opposing surfaces and a set of teeth located on one of the surfaces; and
a cord wrapped at least partially around the ratchet spool; wherein the ratchet spool is tensioned in a direction to wind up the cord;
wherein the ratchet spool is biased in the direction of the housing teeth so that the ratchet teeth will be engaged with the housing teeth when the ratchet spool is in an up position; wherein when the actuating lever is in the up position, the cam pushes the ratchet spool against the bias such that the ratchet teeth and the housing teeth disengage.

14. The tensioning device of claim 13, wherein the ratchet teeth and the housing teeth are undercut at an angle of more than 90 degrees to a horizontal plane perpendicular to a vertical axis of the ratchet spool and the housing.

15. The tensioning device of claim 13, wherein the ratchet spool is biased with a wave spring.

16. The tensioning device of claim 13, wherein the ratchet spool further includes a catch on a bottom surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

17. The tensioning device of claim 13, wherein a joint between the first portion and the second portion is constructed and arranged to include a lip and groove that mate with one another.

18. The tensioning device of claim 13, wherein a plurality of cords are interconnected to the ratchet spool.

19. A tensioning device comprising:
a housing having a first portion and a second portion; the first portion having a set of housing teeth;
an actuating lever having a cam, wherein the actuating lever is pivotally connected to the first portion of the housing;
a ratchet spool positioned within the housing, the ratchet spool having two opposing surfaces and a set of teeth located on one of the surfaces; and
a cord wrapped at least partially around the ratchet spool; wherein the ratchet spool is tensioned in a direction to wind up the cord;
wherein the ratchet spool is biased in the direction of the housing teeth so that the ratchet teeth will be engaged with the housing teeth when the ratchet spool is in an up position; wherein when the actuating lever is in an up position, the cam pushes the ratchet spool against the bias such that the ratchet teeth and the housing teeth disengage.

20. The tensioning device of claim 19, wherein the ratchet teeth and the housing teeth are undercut at an angle of more than 90 degrees to a horizontal plane perpendicular to a vertical axis of the ratchet spool and the housing.

21. The tensioning device of claim 19, wherein the ratchet spool is biased with a wave spring.

22. The tensioning device of claim 19, wherein the ratchet spool further includes a catch on a bottom surface of the ratchet spool and the tensioning device further includes a stopper having an up position and a down position, the stopper being biased toward the up position in which the stopper will block the catch when the ratchet spool is in the down position so that the ratchet spool will not rotate more than 360 degrees in the wind-up direction when the ratchet spool is in a down position.

23. The tensioning device of claim 19, wherein a joint between the first portion and the second portion is constructed and arranged to include a lip and groove that mate with one another.

24. The tensioning device of claim 19, wherein a plurality of cords are interconnected to the ratchet spool.

* * * * *